US007756851B2

(12) United States Patent
Brooks et al.

(10) Patent No.: US 7,756,851 B2
(45) Date of Patent: Jul. 13, 2010

(54) METHOD AND SYSTEM FOR FULL TEXT INDEXING OPTIMIZATION THROUGH IDENTIFICATION OF IDLE AND ACTIVE CONTENT

(75) Inventors: David A. Brooks, Providence, RI (US); Niklas Heidloff, Salzkotten (DE); Igor L. Belakovskiy, Cambridge, MA (US); Michael R. O'Brien, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 794 days.

(21) Appl. No.: 11/237,087

(22) Filed: Sep. 28, 2005

(65) Prior Publication Data

US 2007/0073686 A1    Mar. 29, 2007

(51) Int. Cl.
G06F 7/00 (2006.01)
G06F 17/30 (2006.01)

(52) U.S. Cl. .................. 707/711; 707/715; 707/741

(58) Field of Classification Search ............. None
See application file for complete search history.

(56) References Cited

U.S. PATENT DOCUMENTS

| | | | | |
|---|---|---|---|---|
| 5,555,346 | A | * | 9/1996 | Gross et al. ............ 706/45 |
| 6,073,142 | A | * | 6/2000 | Geiger et al. ........... 715/205 |
| 6,134,582 | A | * | 10/2000 | Kennedy .............. 709/206 |
| 6,718,321 | B2 | | 4/2004 | Birrell et al. |
| 2002/0099681 | A1 | * | 7/2002 | Gainey et al. .......... 707/1 |
| 2003/0041112 | A1 | * | 2/2003 | Tada et al. ............. 709/206 |
| 2003/0229626 | A1 | | 12/2003 | Nayak |
| 2004/0064473 | A1 | * | 4/2004 | Thomas et al. ......... 707/102 |
| 2004/0158580 | A1 | | 8/2004 | Carmel et al. |
| 2004/0267722 | A1 | | 12/2004 | Larimore et al. |
| 2005/0060293 | A1 | | 3/2005 | Day et al. |
| 2005/0102287 | A1 | * | 5/2005 | Poole .................... 707/9 |
| 2005/0137996 | A1 | * | 6/2005 | Billsus et al. ........... 707/1 |
| 2005/0165750 | A1 | * | 7/2005 | Shakib et al. ........... 707/3 |

\* cited by examiner

Primary Examiner—Pierre M Vital
Assistant Examiner—Augustine Obisesan
(74) Attorney, Agent, or Firm—David A. Dagg

(57) ABSTRACT

A system for full text indexing optimization that operates based on identification of idle and active content in a content source, and by prioritizing indexing of idle content over active content. Active and idle content items are automatically identified, and idle content items are given a higher priority for indexing, while active content items are given a lower priority. Active content items are generally those that are considered relatively more likely to be located by the user without using the full text indexing function, while idle content items are those content items that are relatively more likely to be located through use of the full text indexing function. The specific content item attributes that are used to determine whether a given content item is active or idle may depend on the type content source for which the full text index is being provided. Additionally, the determination of which content items are active and which are idle may be based on predetermined, static criteria, and/or dynamically determined use patterns determined by monitoring operations performed on content items by a user.

29 Claims, 3 Drawing Sheets

METHOD AND SYSTEM FOR FULL TEXT INDEXING OPTIMIZATION THROUGH IDENTIFICATION OF IDLE AND ACTIVE CONTENT

FIELD OF THE INVENTION

The present invention relates generally to full text indexing, and more specifically to a method and system for full text indexing optimization through identification of idle and active content.

BACKGROUND OF THE INVENTION

As it is generally known, search performance can be improved by maintaining a full text index representing the contents of various types of content sources. However, maintaining an up to date full text search index can require significant disk space and processor resources. While some existing techniques have proven effective for improving the efficiency of full text indexing, they have significant limitations.

With regard to disk space efficiency, existing systems have reduced index size by using efficient data storage structures. This technique is limited by the fact that over-compression of data structures may negatively impact the performance of user queries.

With regard to processor utilization, some performance problems can be alleviated by asynchronously indexing content when the computer is inactive. While asynchronous content indexing during periods of inactivity can be effective in certain execution environments, such as an end user's desktop system in which the central processing unit (CPU) goes unused for many hours in the evening, it isn't applicable in all cases. For example, in the case of portable devices, such as laptop computers and personal digital assistants (PDAs), the device typically conserves power by entering a hibernated or shutdown state during periods of user inactivity, thus limiting the processor resources available for asynchronous indexing. In the case of server systems, or clusters of server systems, on-demand service environments require that services be actively provided at all times. While adding more server systems or resources can increase overall resource availability, the resulting additional costs are undesirable and may be prohibitive.

Several performance issues arise with regard to managing full text indexing capabilities in existing systems. These performance issues require careful system configuration and tuning, to avoid situations in which costs, in terms of disk and/or processor resource consumption, outweigh the benefits provided to the user. For example, at least one existing electronic mail ("email") system allows an administrator user to selectively enable full text indexing for individual public folders and mailbox stores. This can help reduce the amount of content processed by allowing the administrator to manually select which content is represented in the full text index. Full text indexing processing levels may also be set, with lower settings require full text indexing to use of less processor resources. Such processor limitations may potentially result in the index representing content that is not current, since the indexing service may have trouble keeping up with the generation of new content to be indexed. While existing techniques alleviate some performance problems of full text indexing, the improvements come at the expense of the user's search experience, since the index may end up representing content that is not current, and/or fail to represent important content.

For the above reasons, it would be desirable to have a new system for providing a full text index. In view of the inherent costs of full text indexing, the new system should advantageously include a top down design paradigm providing improved insight into what content is most desirable to represent in the full text index. The new system should effectively reduce the net costs of maintaining a useful full text index without negatively impacting a user's experience.

SUMMARY OF THE INVENTION

To address the above described and other shortcomings of previous systems, a new method and system for full text indexing optimization are disclosed that operate based on the identification of idle and active content in a content source for which a full text index is provided. The disclosed system optimizes full text indexing performance by prioritizing the indexing of idle content over active content.

Active and idle content items are automatically identified, to support the prioritized indexing provided by the disclosed system. Various specific techniques may be applied to categorize content items as active and idle. Active content items are generally those content items that are relatively more likely to be located by the user without using the full text index, while idle content items are those content items that are relatively more likely to be located through use of the full text index. For example, when a content item has been recently operated on by a user, the user is likely to know the location of that content item, and not need to use a search based on the full text index to find it. Conversely, if a content item has not been operated on for a relatively long time period, the user is more likely to use the search function supported by the full text index to find the content item. Accordingly, in one embodiment, the disclosed system prioritizes indexing of those content items that have not been recently operated on by the user over those that have.

The specific content item attributes that are used to determine whether a given content item is active or idle may depend on the type of content source for which the full text index is being provided. Moreover, the determination of which content items are active and which are idle may be based on predetermined, static criteria, and/or dynamically determined use patterns determined by monitoring operations performed on content items by a user.

For example, in embodiments such as where the content source is a set of messages stored for a user, searches are likely to be used to locate messages that are known to exist, but that cannot be quickly located based on the user's short term memory. In a messaging system, incoming messages are often received into a single structure (e.g. an "Inbox"), and newly received messages can often easily be found by visual inspection within that structure without applying a search function. New messages are also often the subject of operations that keep the location of a message current in the user's mind, such as message creation, reading a message, responding to a message, forwarding a message, etc. After some time, however, a message may become idle, in that the user stops operating on the message as frequently, and is therefore less likely to remember its location. Accordingly, newly received messages may initially be categorized as active content items, in order to delay the use of resources to index them until they have become idle. Moreover, when an operation is performed on an active message, the disclosed system may act to add a time delay to its transition to the idle state. However, messages still located in an Inbox structure after a relatively long time period, whether read or unread, that have not recently been operated on, are more likely targets of a user search.

Similarly, messages that have been read and moved to a folder other than the Inbox may be considered relatively likely search targets. Based on such content item "life cycle" events, the disclosed system can effectively determine active versus idle subsets of the content items stored in a content source. Metadata describing content item categories can then be used to prioritize indexing of idle content items over active content items. In cases where there is a significant likelihood that content items will be deleted before they enter the idle state, as is typically the case for newly received messages in a messaging system, the disclosed system advantageously avoids indexing of many content items that are relatively quickly deleted, and might otherwise be unnecessarily indexed.

Thus there is disclosed a new system for providing a full text index that includes a top down approach for determining what content is most desirable to represent in the full text index. The new system reduces the net costs of maintaining a full text index without adversely impacting a user's experience.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
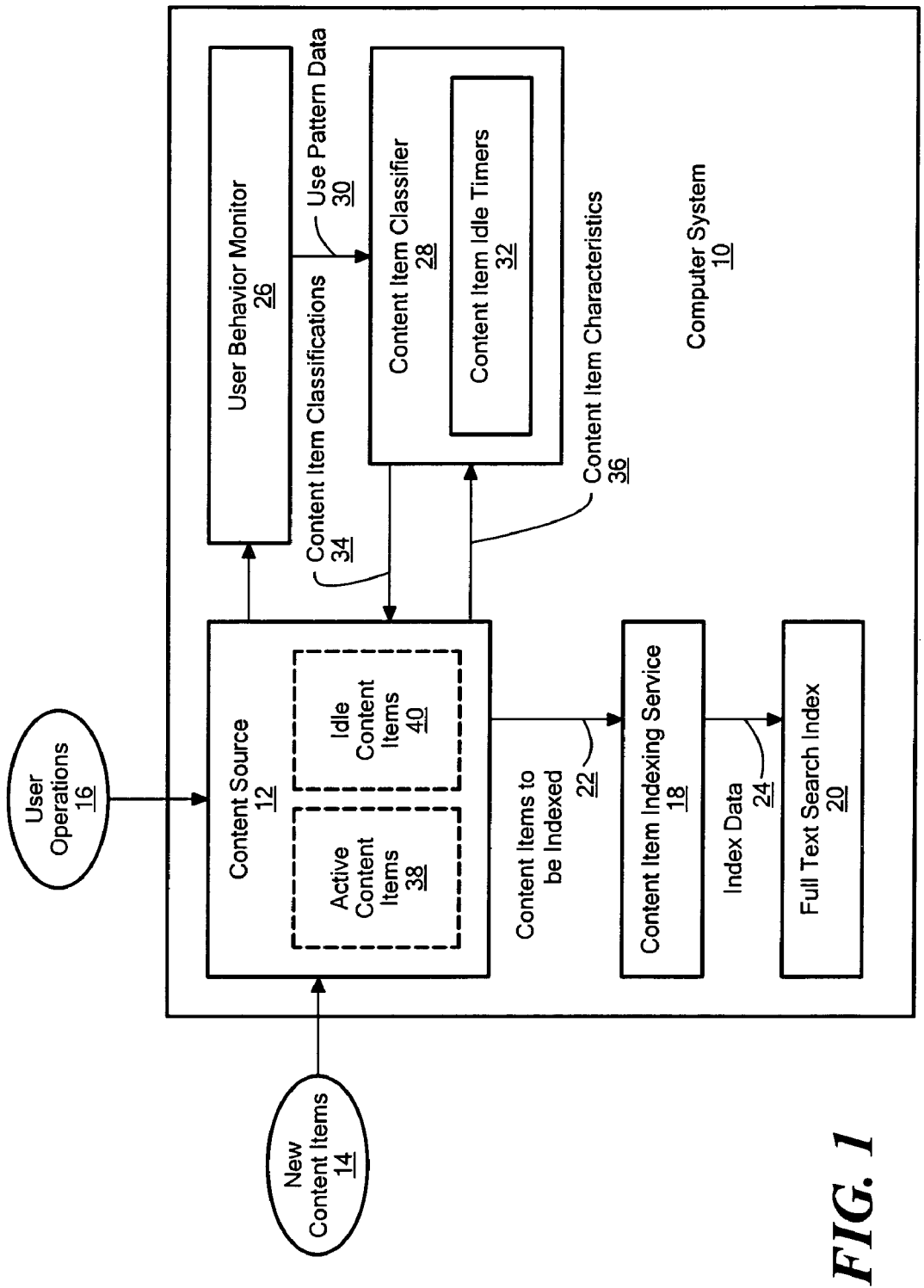
FIG. 1 is a first block diagram showing the structure and operation of software components in an illustrative embodiment of the disclosed system.

As shown in FIG. 1, an illustrative embodiment of the disclosed system operates using a number of software components executing on at least one computer system, shown for purposes of illustration as the computer system 10. The computer system 10 may, for example, include at least one processor, program storage, such as memory, for storing program code executable on the processor, and one or more input/output devices and/or interfaces, such as data communication and/or peripheral devices and/or interfaces. The computer system 10 may further be embodied as one or more physically distributed computer systems, such as one or more client and server computer systems, that are communicably connected by a data communication system, such as a Local Area Network (LAN), the Internet, or the like. The computer system 10 may further include appropriate operating system software.

In the embodiment of FIG. 1, a content source 12 receives new content items 14, and performs user operations 16. For example, in the case where the content source 12 is an email application program, the new content items 14 may consist of email messages received over a communications network, and the user operations 16 may include any specific operation involving email messages.

A user behavior monitor 26 collects and analyzes user operations performed on the content source 12. The user behavior monitor 26 passes user pattern data 30 to the content item classifier 28. The user pattern data 30 may indicate user actions detected through the content source 12, indicate dynamically determined use patterns that are predictive of whether or not content items subject to those patterns are likely to enter the idle state, and/or specific content items that are more or less likely to enter the idle state based on the user operations performed on them.

In addition to the use pattern data 30 from the user behavior monitor 26, the content item classifier 30 receives content item characteristics 36 from the content source 12. Such content item characteristics 36 may include any specific kind of characteristic. For example, for content items consisting of email messages, the content item characteristics 36 may include the times at which messages are received or processed, portions of the message contents or message metadata, the identity of one or more message threads and the messages they contain, and/or other message characteristics.

The content item classifier 28 operates to determine content item classifications 34 that define which content items are included within the active content items 38, and which are included within the idle content items 40. The content item classifier 28 classifies the content items of the content source 12 based on the user pattern data 30 and content item characteristics 30 it receives. The content item classifications 34 may, for example, be maintained as metadata associated with the content items of the content source 12, or using any other specific technique.

In an illustrative embodiment, the content item classifier 28 maintains content item idle timers 32 to help determine when to classify a content item as one of the idle content items 40. Each one of the content item idle timers is associated with a corresponding one of the active content items 38. The content item idle timers 32 may, for example, be set to expire after an idle time period passes without any user operations being performed on an associated content item that indicate the associated content item should continue to be considered active. The time remaining in each of the content item idle timers 32 may be adjusted dynamically in response to the detection of user actions indicating that the associated content item is more or less likely to enter the idle state. For example, detection of certain user operations on a content item may indicate that the content item is more likely to become idle, and accordingly the time remaining in the associated idle timer may be reduced. Conversely, detection of another user operation may indicate that the content item on which the operation is performed is less likely to become idle, causing the time remaining in the associated idle timer to be increased. The specific amount the time remaining is reduced or increased in such cases may be independent of operation type, or may vary based on the predictiveness of the specific operations detected. Moreover, the set of specific operations that are considered predictive of whether or not a content item they are performed on will become idle may be predefined and/or dynamically determined in response to the use pattern data 30.

The content item characteristics 36 may similarly be used to control when a content item is considered active or idle. The presence of a specific characteristic may indicate whether a content item is more or less likely to become idle. Accordingly when such a characteristic is detected, the time remaining in the idle timer associated with the content item may be increased if the content item is less likely to become idle, or decreased if the content item is more likely to become idle. The amount of increase or decrease may be characteristic independent, or may vary with the predictiveness of specific characteristics. The characteristics considered predictive of whether or not a content item will become idle may be predefined, and/or dynamically determined in response to the use pattern data 30.

The content item indexing service 18 operates by obtaining content items to be indexed 22 from the content source 12, and by loading index data 24 into the full text search index 20. The content items to be indexed 22 reflect the categorization of active content items 38 and idle content items 40. The idle content items 40 are generally made available to the content item indexing service 18 before the active content items 38. In this way, if the content item indexing service is resource constrained in any way and for any reason, indexing of idle content items 40 is advantageously prioritized over indexing of the active content items 38.

The content item indexing service 18 may obtain the content items to be indexed 22 in various specific ways. For example, the indexing service 18 may periodically check for available content items in the content source 12. Alternatively, content items to be indexed 22 may be made available by passing indications of available content items to the content item indexing service 18.

Figure 2:
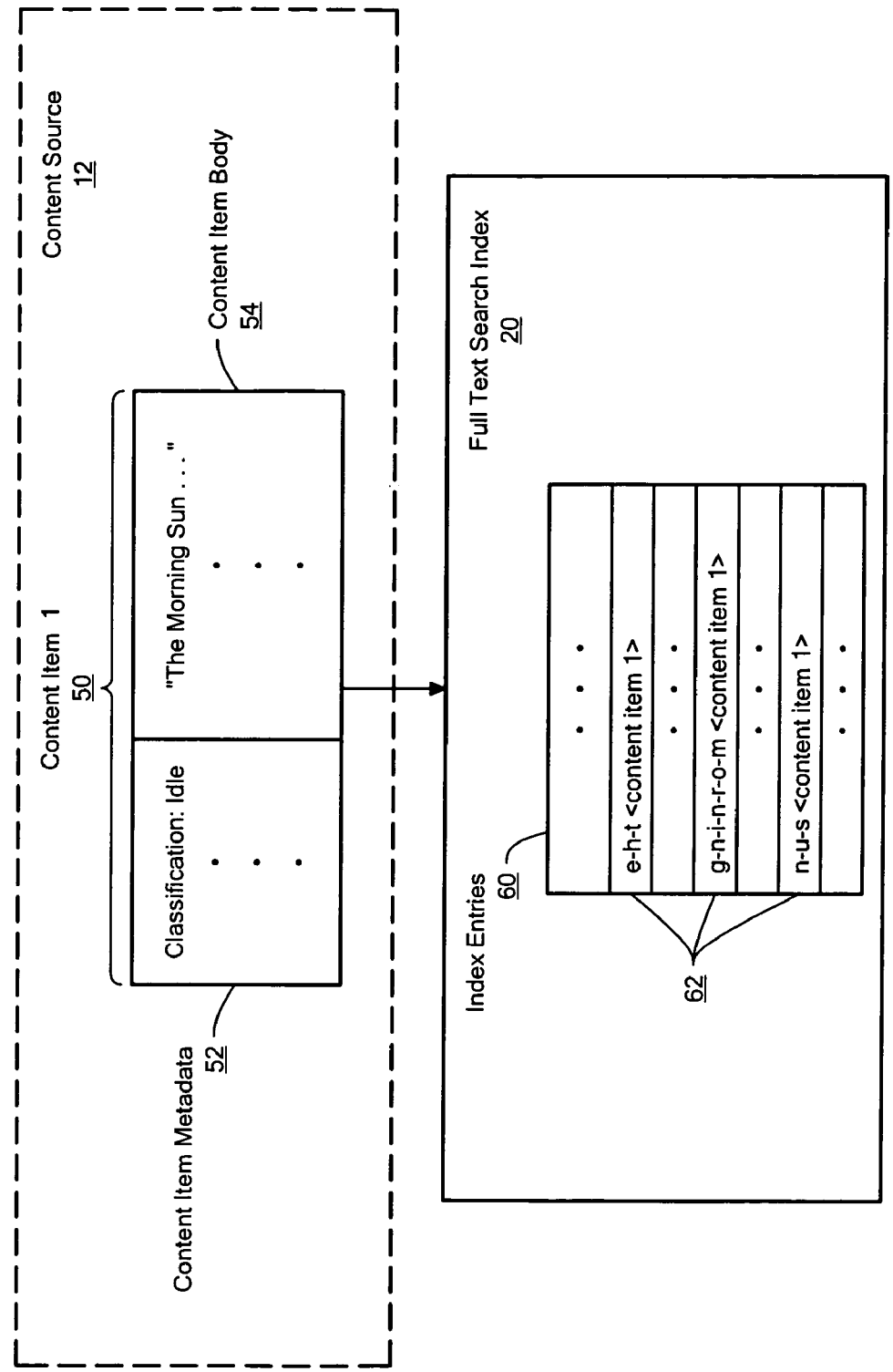
FIG. 2 is a second block diagram showing the structure and operation of software components in an illustrative embodiment of the disclosed system.

FIG. 2 is a block diagram showing the structure and operation of software components in an illustrative embodiment of the disclosed system. In the embodiment of FIG. 2, the content source 12 is, for purposes of explanation, an email or other type of messaging application. A content item 1 50 is shown as a message having content item metadata 52, and a content item body 54. The content item metadata 52 indicates that the content item 1 50 has been classified as idle. The content item body 54 includes the text "The Morning Sun . . ."

After processing by an embodiment of the content item indexing service 18, index data 24 representing the content item 1 50 is stored in the full text search index 20. For purposes of illustration and explanation, the full text search index 20 is shown including index entries 60. The index entries 60 in FIG. 2 are an example of a search index data structure that enables efficient text searching across an associated set of content items. The index entries 60 may make up or form part of what is sometimes referred to by computer scientists as a "trie", from the word "retrieval". While the disclosed system may be embodied using a trie data structure, it is not limited to such an embodiment, and any other specific type or structure may be used for the full text search index 20. The index entries 60 are used to store what is sometimes referred to as an index "profile" of the content item 1 50.

In the example of FIG. 2, the index entries 60 associate the words "the", "morning", and "sun" with content item 1 50. As in one conventional practice, matching of text strings in the index entries 60 is done in reverse character order; "the" is therefore matched by the entry containing "e-h-t", "morning" by "g-n-i-n-r-o-m", etc. The entries 62 in the index entries 60 representing the contents of the content item 1 50 may further include indications, pointers or links describing where the content item 1 50 is stored, so that such information can be provided in search results for search queries matching the contents document 30. Other information, reflecting term frequency of occurrence or location within the content item 1 50, may also be included within the entries 62.

Figure 3:
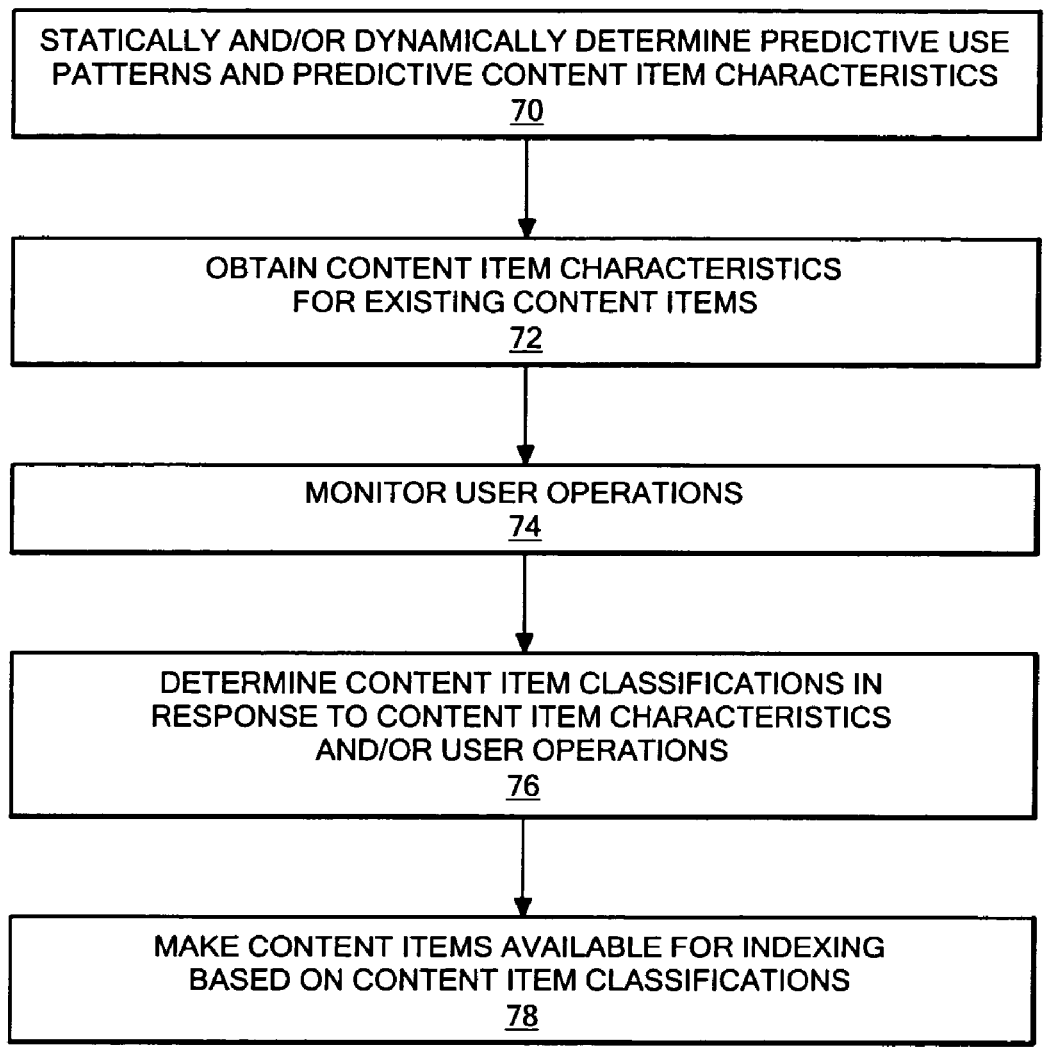
FIG. 3 is a flow chart showing steps performed by an embodiment of the disclosed system.

FIG. 3 is a flow chart showing steps performed in an illustrative embodiment of the disclosed system. At step 70, the disclosed system determines use patterns and/or content item characteristics that are predictive of whether or not a given content item will enter the idle state. The determination of use patterns and/or content item characteristics at step 70 may involve statically defined use patterns and/or content characteristics, such as may be predetermined at system design time, configured by an administrator, and/or set by a user. The use patterns and/or content item characteristics determined at step 70 may alternatively, or in addition, be dynamically determined through a run time "learning" process, based on user operations monitored by an embodiment of the disclosed system.

For example, in the case where the content source is an email application, the disclosed system may be embodied such that it dynamically develops a logical "understanding" of whether specific messages are likely to be moved into various folder structures. Such a dynamically determined understanding can consist of predictive use patterns and/or predictive item characteristics that aid in categorization of specific messages. If a given message has a high probability of being stored in a particular folder within a user's file structure, then such an embodiment may operate to delay indexing of the message until after it is filed in that folder. This kind of delay may, for example, be implemented by increasing a time remaining in an idle timer or the like. Similarly, if a message is sufficiently similar to other messages that have been deleted, then an embodiment of the disclosed system may delay entry of that message into the idle state, thereby delaying indexing of the message, or prevent indexing of the message altogether. On the other hand, if the disclosed system determines that a user tends to leave messages in an Inbox structure, then messages that are unlikely to be deleted may have the time remaining in their idle timers decreased so that they are indexed earlier.

At step 72, the disclosed system obtains content item characteristics for a number of content items stored in a content source. At step 74, the disclosed system monitors user operations performed on the content items. The disclosed system then operates at step 76 to determine the classifications of content items in response to the predictive user patterns and predictive content item characteristics determined at step 70, to the content item characteristics of existing content items determined at step 72, and to the user operations monitored at step 74.

The classifications of content items as active and idle at step 76 can be provided in any specific manner. Exemplary embodiments range from using relatively simple rule based heuristics to using advanced data mining algorithms that improve content classification as the user continues to use the platform. Those skilled in the art will recognize that the present invention is not limited to any specific approach in this regard.

In various specific embodiments, the following rules are examples of some of the possible rules that could be used to classify messages:

New messages are initially classified as active, and remain active for some period, e.g. 48 hours.

Detection of any user action performed on a message (i.e. reading, replying to, forwarding, etc.) resets an associated idle timer counter to its maximum value, e.g. 48 hours.

Detection of a user filing a message into a folder reduces the time remaining in the associated idle timer to some predetermined amount, e.g. 3 hours.

Receiving new messages that are part of the same message thread as one or more previously received messages results in a change to the idle timers for all messages in the thread, e.g. resets the idle timers for all messages in the thread to 48 hours. For example, a series of reply messages, based on a single "root" message, each of which may add some amount of text or other content to the preceding message or reply, and typically each having a common associated "SUBJECT:" string, may be considered a message "thread".

Detection of a user modifying a draft response to a message resets the associated idle timer to its maximum, e.g. 48 hours.

Additionally, or in the alternative, the disclosed system may be embodied using dynamic classification rule systems that adjust according to user behavior. For example, the disclosed system may be embodied to modify its classification rules in response to tracking the time between operations on messages, and/or the minimum and average time between operations on messages that are opened by a user from full text search results. This type of information can be used to adjust idle timers associated with active messages, in order to allow for additional idle time when appropriate. Moreover, dynamic rule adjustment may be based on any dynamically determined user patterns that are predictive of whether messages in general, or specific messages having certain message characteristics, are more likely or less likely to be deleted or enter the idle state.

The content item classifications determined at step 76 are then used to control the way content items are made available for indexing at step 78, such that content items that are classified as idle are made available for indexing before content items classified as active.

The disclosed system provides many advantages over prior approaches in various specific types of systems. For example, as the proliferation of email on handheld devices continues to grow, the need to maintain a full text search index that is resource efficient becomes ever more important. The disclosed system may also advantageously be applied within server environments, in which the information technology budget may be shrinking, but the amount of digital content that needs to be indexed is growing at increasingly faster rates.

The active content items in the disclosed system are items whose locations are likely to be in the user's consciousness, and can therefore be found without the use of a full text search. Idle content items, on the other hand, are items whose locations have likely left the user's short term memory, and therefore have a higher likelihood of being the targets of a full text search. The disclosed system avoids the indexing of active content as more than a delay tactic. For content sources such as messaging applications, a significant percentage of content items will never make it to the idle state, since many of them are deleted while still in an active state. Accordingly, the disclosed system avoids the unnecessary indexing of content that is deleted without ever becoming idle.

Those skilled in the art will recognize that while some of the above examples are described for purposes of explanation in the context of an embodiment for a content source consisting of a set of electronic mail messages, the present invention is not so limited. Examples of content sources for which full text indexing can be advantageously be used include various types of structures used to store and represent messages stored for a user in a messaging system, such as an electronic mail, instant messaging, or other communication system, user specific content repositories like calendars and task lists, shared stores that are replicated to a user's client machine. These repositories may include persistent chat conversations, activity threads, discussion threads, etc. The specific approach to classifying content items may vary according to the specific content source.

The Figures are block diagram and flowchart illustrations of methods, apparatus(s) and computer program products according to an embodiment of the invention. It will be understood that each block of the Figures, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using wireless, baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative program command structures, one skilled in the art will recognize that they may be embodied using a variety of specific command structures.

We claim:

1. A computer-implemented method for providing a full text search index, comprising:
   determining an active subset of a set of content items, wherein each content item in said active subset of said set of content items is associated with a respective one of a plurality of content item idle timers;
   determining an idle subset of said set of content items at least in part by reclassifying content items from said active subset of said set of content items to said idle subset of said set of content items responsive to expiration of their associated content item idle timers;
   making said idle subset of said set of content items available for indexing into said full text index, wherein said active subset of said set of content is not available for indexing; and
   resetting respective ones of said content item idle timers responsive to detecting that an operation is performed on said associated one of said content items in said active subset of said set of content items.

2. The method of claim 1, further comprising:
   decreasing a time remaining in respective ones of said content item idle timers in response to detecting a user performing a specific operation on said associated one of said content items in said active subset of said set of content items.

3. The method of claim 2, wherein said specific operation is dynamically determined in response to determining at least one use pattern of said user.

4. The method of claim 2, wherein said set of content items comprises a set of electronic mail messages, and wherein said specific operation comprises moving said associated electronic mail message from an inbox folder structure to another folder structure.

5. The method of claim 1, further comprising:
increasing a time remaining in respective ones of said idle timers in response to detecting a user performing a specific operation on said associated ones of said content items in said active subset of said set of content items.

6. The method of claim 5, wherein said specific operation is dynamically determined in response to determining at least one use pattern of said user.

7. The method of claim 5, wherein said set of content items comprises a set of electronic mail messages, and wherein said specific operation comprises at least one operation from the set of operations consisting of reading said associated electronic mail message, replying to said associated electronic mail message, forwarding said electronic mail message, and modifying a draft response to said electronic mail message.

8. The method of claim 1, wherein said set of content items comprises a set of electronic mail messages, and further comprising:
increasing a time remaining of respective ones of said content item idle timers in response to detecting receipt of new electronic mail messages belonging to message threads to which also belong the electronic mail messages associated with said respective ones of said content item idle timers.

9. The method of claim 1, further comprising:
monitoring user behavior to determine at least one use pattern; and
adjusting a time remaining of said content item idle timers responsive, at least in part, to said at least one use pattern.

10. The method of claim 9, wherein said at least one use pattern comprises an average time between user operations.

11. The method of claim 9, wherein said at least one use pattern comprises a minimum time between user operations.

12. The method of claim 9, wherein said at least one use pattern is associated with a content item characteristic.

13. The method of claim 12, wherein said use pattern indicates a likelihood that a given content item having said content item characteristic will be enter said idle subset prior to being deleted.

14. The method of claim 9, wherein said use pattern indicates a likelihood that a given content item having said content item characteristic will be deleted prior to entering said idle subset.

15. A system comprising:
at least one processor and a computer readable memory having program code stored thereon for, when executed on said processor, providing a full text search index, said program code comprising:
program code for determining an active subset of a set of content items, wherein each content item in said active subset of said set of content items is associated with a respective one of a plurality of content item idle timers,
program code for determining an idle subset of said set of content items at least in part by reclassifying content items from said active subset of said set of content items to said idle subset of said set of content items responsive to expiration of their associated content item idle timers,
program code for making said idle subset of said set of content items available for indexing into said full text index, wherein said active subset of said set of content is not available for indexing, and
program code for resetting respective ones of said content item idle timers responsive to detecting that an operation is performed on said associated one of said content items in said active subset of said set of content items.

16. The system of claim 15, said program code further comprising:
program code for decreasing a time remaining in respective ones of said content item idle timers in response to detecting a user performing a specific operation on said associated one of said content items in said active subset of said set of content items.

17. The system of claim 16, wherein said specific operation is dynamically determined in response to determining at least one use pattern of said user.

18. The system of claim 16, wherein said set of content items comprises a set of electronic mail messages, and wherein said specific operation comprises moving said associated electronic mail message from an inbox folder structure to another folder structure.

19. The system of claim 15, said program code further comprising:
program code for increasing a time remaining in respective ones of said idle timers in response to detecting a user performing a specific operation on said associated ones of said content items in said active subset of said set of content items.

20. The system of claim 19, wherein said specific operation is dynamically determined in response to determining at least one use pattern of said user.

21. The system of claim 19, wherein said set of content items comprises a set of electronic mail messages, and wherein said specific operation comprises at least one operation from the set of operations consisting of reading said associated electronic mail message, replying to said associated electronic mail message, forwarding said electronic mail message, and modifying a draft response to said electronic mail message.

22. The system of claim 15, wherein said set of content items comprises a set of electronic mail messages, and said program code further comprising:
program code for increasing a time remaining of respective ones of said content item idle timers in response to detecting receipt of new electronic mail messages belonging to message threads to which also belong the electronic mail messages associated with said respective ones of said content item idle timers.

23. The system of claim 15, said program code further comprising:
program code for monitoring user behavior to determine at least one use pattern; and
program code for adjusting a time remaining of said content item idle timers responsive, at least in part, to said at least one use pattern.

24. The system of claim 23, wherein said at least one use pattern comprises an average time between user operations.

25. The system of claim 23, wherein said at least one use pattern comprises a minimum time between user operations.

26. The system of claim 23, wherein said at least one use pattern is associated with a content item characteristic.

27. The system of claim 26, wherein said use pattern indicates a likelihood that a given content item having said content item characteristic will be enter said idle subset prior to being deleted.

28. The system of claim 23, wherein said use pattern indicates a likelihood that a given content item having said content item characteristic will be deleted prior to entering said idle subset.

29. A computer program product comprising:

a computer readable storage medium having program code stored thereon for, when executed, providing a full text search index, said program code comprising:

program code for determining an active subset of a set of content items, wherein each content item in said active subset of said set of content items is associated with a respective one of a plurality of content item idle timers, program code for determining an idle subset of said set of content items at least in part by reclassifying content items from said active subset of said set of content items to said idle subset of said set of content items responsive to expiration of their associated content item idle timers, program code for making said idle subset of said set of content items available for indexing into said full text index, wherein said active subset of said set of content is not available for indexing, and program code for resetting respective ones of said content item idle timers responsive to detecting that an operation is performed on said associated one of said content items in said active subset of said set of content items.

* * * * *